United States Patent
Hong et al.

(10) Patent No.: US 12,227,684 B2
(45) Date of Patent: Feb. 18, 2025

(54) METHOD OF MANUFACTURING A CORE-SHELL STRUCTURED QUANTUM DOT PARTICLE, CORE-SHELL STRUCTURED QUANTUM DOT PARTICLE MANUFACTURED THEREBY, POPULATION OF THE CORE-SHELL STRUCTURED QUANTUM DOT PARTICLES, AND DISPLAY DEVICE INCLUDING THE SAME

(71) Applicants: SHIN-A T&C, Seoul (KR); UNIAM, Seoul (KR)

(72) Inventors: Seung Mo Hong, Incheon (KR); Jin Han Song, Seoul (KR); Hyeok Jin Hong, Suwon-si (KR); Seok Kyu Park, Seoul (KR); Hye Ran Jung, Gwangmyeong-si (KR); Ju Young Lee, Bucheon-si (KR); Jae Woo Jang, Seoul (KR)

(73) Assignees: SHIN-A T&C, Seoul (KR); UNIAM, Seoul (KR)

(*) Notice: Subject to any disclaimer, the term of this patent is extended or adjusted under 35 U.S.C. 154(b) by 282 days.

(21) Appl. No.: 17/575,902

(22) Filed: Jan. 14, 2022

(65) Prior Publication Data

US 2022/0228058 A1    Jul. 21, 2022

(30) Foreign Application Priority Data

Jan. 18, 2021    (KR) ........................ 10-2021-0006826

(51) Int. Cl.
| | |
|---|---|
| *C09K 11/70* | (2006.01) |
| *B82Y 20/00* | (2011.01) |
| *B82Y 30/00* | (2011.01) |
| *B82Y 40/00* | (2011.01) |
| *C01G 15/00* | (2006.01) |
| *C09K 11/02* | (2006.01) |
| *C09K 11/74* | (2006.01) |

(52) U.S. Cl.
CPC .............. *C09K 11/70* (2013.01); *C01G 15/00* (2013.01); *C09K 11/025* (2013.01); *C09K 11/703* (2013.01); *C09K 11/7492* (2013.01); *B82Y 20/00* (2013.01); *B82Y 30/00* (2013.01); *B82Y 40/00* (2013.01); *C01P 2004/64* (2013.01); *C01P 2006/60* (2013.01)

(58) Field of Classification Search
CPC ..... C09K 11/025; C09K 11/70; C09K 11/703; C09K 11/7492
See application file for complete search history.

(56) References Cited

U.S. PATENT DOCUMENTS

| | | | |
|---|---|---|---|
| 11,264,543 B2 | 3/2022 | Hong et al. | |
| 2006/0236918 A1 | 10/2006 | Jun et al. | |
| 2012/0205586 A1 | 8/2012 | Ren et al. | |
| 2014/0361228 A1* | 12/2014 | Jang ........................ | C30B 29/60 |
| | | | 252/519.4 |
| 2017/0029693 A1 | 2/2017 | Gruhlke et al. | |
| 2018/0024058 A1 | 1/2018 | Kim et al. | |
| 2018/0074401 A1* | 3/2018 | Nam .................. | G02F 1/133377 |
| 2020/0220043 A1 | 7/2020 | Park et al. | |
| 2021/0054273 A1 | 2/2021 | Moriyama et al. | |
| 2022/0154071 A1* | 5/2022 | Bang ...................... | C09K 11/56 |

FOREIGN PATENT DOCUMENTS

| | | |
|---|---|---|
| CN | 110317609 A | 10/2019 |
| CN | 111117621 A | 5/2020 |
| CN | 112210366 A | 1/2021 |
| JP | 2018-153915 A | 10/2018 |
| KR | 10-2020-0120529 A | 10/2020 |

(Continued)

OTHER PUBLICATIONS

Kangyong Kim et al., "Zinc Oxo Clusters Improve the Optoelectronic Properties on Indium Phosphide Quantum Dots". Chemistry of Materials 2020, pp. 2795-2802, Mar. 10, 2020.*

(Continued)

*Primary Examiner* — C Melissa Koslow
(74) *Attorney, Agent, or Firm* — Sughrue Mion, PLLC (57) ABSTRACT

A method of preparing a core-shell structured quantum dot particle includes the steps of (a) preparing a core of quantum dot particle containing indium (In) and phosphorus (P) and (b) forming a shell by reacting the core of the quantum dot particles prepared in step (a), a zinc oxo cluster represented by Formula 1 below, and at least one anion precursor containing a group 16 element. Quantum dot particles prepared by the method; a population of the quantum dot particles; and a display device containing the population of the quantum dot particles are disclosed:

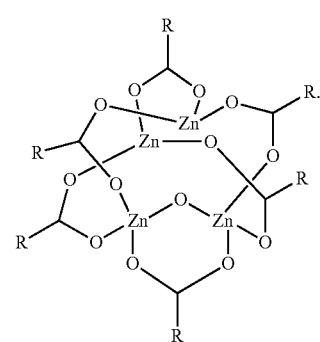

[Formula 1]

23 Claims, 4 Drawing Sheets

(56) References Cited

FOREIGN PATENT DOCUMENTS

WO         2019/131402 A1     7/2019
WO   WO 2020/209580      * 10/2020

OTHER PUBLICATIONS

Office Action dated Jan. 18, 2023 from the Korean Patent Office in Application No. 10-2021-0006826.
Daniel Franke et al., "The Unexpected Influence of Precursor Conversion Rate in the Synthesis of III-V Quantum Dots", Angewandte Chemie International Edition, 2015, pp. 14299-14303, 54(48).
Rene Panzer et al., "Versatile Tri(pyrazolyl)phosphanes—Application as phosphorus precursors for the synthesis of highly emitting InP/ZnS quantum dots", Angewandte Chemie International Edition, 2017, pp. 14737-14742, 56(46).
Kangyong Kim et al., "Zinc Oxo Clusters Improve the Optoelectronic Properties on Indium Phosphide Quantum Dots", Chemistry of Materials. 2020, pp. 2795-2802, 32.
Office Action issued Jun. 12, 2024 in Chinese Application No. 202210040336.5.
Shigi Li, "Preparation of $CsPbBr_3$/CdS Perovskite Core-shell Quantum Dots and Application of Optoelectronic Devices", A Thesis Submitted to Chongqing University, Apr. 2018, publication date Apr. 15, 2019 (88 pages total).

* cited by examiner

METHOD OF MANUFACTURING A CORE-SHELL STRUCTURED QUANTUM DOT PARTICLE, CORE-SHELL STRUCTURED QUANTUM DOT PARTICLE MANUFACTURED THEREBY, POPULATION OF THE CORE-SHELL STRUCTURED QUANTUM DOT PARTICLES, AND DISPLAY DEVICE INCLUDING THE SAME

CROSS-REFERENCE TO RELATED APPLICATION

This application claims under 35 U.S.C. § 119(a) the benefit of Korean Patent Application No. 10-2021-0006826 filed on Jan. 18, 2021, the entire content of which is incorporated herein by reference.

BACKGROUND

(a) Technical Field

The present invention relates to a method of preparing a core-shell structured quantum dot particle, a core-shell structured quantum dot particle prepared thereby, a population of the core-shell structured quantum dot particles, and a display device comprising the same.

(b) Background Art

For quantum dot particles, the particle size distribution has a great influence on the optical properties, and as the size distribution becomes wider, the quantum efficiency is decreased and the full width at half maximum becomes wider. In general, quantum dot particles in the form of cadmium have a very narrow particle size distribution, and thus have the advantage of very high color reproducibility and luminance when applied to a display device. However, currently, quantum dots in the form of cadmium are subject to environmental regulations due to their toxicity, and accordingly, their use has become impossible. Therefore, many studies are being conducted to replace cadmium-based quantum dot particles, and a representative example of this is indium phosphide-based (hereinafter, InP-based) quantum dot particles.

Most researchers believe that the particle size distribution may be broadened by the Ostwald ripening phenomenon as organometallic phosphorus compounds are consumed rapidly during the growth stage of InP-based core. The Ostwald ripening phenomenon is a theory explaining the principle that particles dissolved in the form of an emulsion grow, and refers to a phenomenon in which, when the size of particles in the emulsion is varied, relatively small particles continue to become smaller, and larger particles become larger, and thus small particles eventually disappear.

Therefore, in order to control the size distribution of InP-based quantum dot particles, various studies are being conducted to control the growth rate of the core particles of InP-based quantum dot particles by changing the reactivity of organometallic phosphorus compounds.

For example, researchers attempted to isolate the stages of nuclear formation and growth by using precursors of organometallic phosphorus (P) compounds, such as tris(trimethylgermyl)phosphine and tris(pyrazolyl)phosphane, which are less reactive, instead of tris(trimethylsilyl)phosphine having high reactivity generally used in the prior art.

However, although this method showed slight improvement in terms of particle uniformity, it was confirmed that the characteristics of quantum efficiency and full width at half maximum are insufficient compared to Cd-based quantum dot particles.

As another example, when preparing the core of InZnP-based quantum dot particles, it has been proposed to control the growth of core particles using a zinc precursor, further heat-treat the zinc precursor to form a zinc oxo cluster, and use this to control the size of the core.

However, it was confirmed that the technology for controlling the size of the core particles is difficult to ensure reproducibility, and commercialization is difficult because there are many shortcomings in effectiveness.

RELATED REFERENCES

Non-Patent Document

Kangyong Kim et, al., "Zinc Oxo Clusters Improve the Optoelectronic Properties on Indium Phosphide Quantum Dots", Chem. Mater, 2020, 32, 2795-2802

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been devised to solve the above problems of the prior art, and thus it is an object of the present invention to provide a method for manufacturing core-shell structured quantum dot particles having a uniform particle size, excellent quantum yield (QY), and a narrow full width at half maximum, a core-shell structured quantum dot particle prepared thereby, a population of the core-shell structured quantum dot particles, and a display device comprising the same.

In order to achieve the above object, the present invention provides a method of preparing a core-shell structured quantum dot particle comprising the steps of,
(a) preparing a core of quantum dot particle containing indium (In) and phosphorus (P); and
(b) forming a shell by reacting the core of the quantum dot particle prepared in step (a), zinc oxo cluster, which is an oligomer in the form of zinc oxide, and one or more anion precursors containing a group 16 element.

In addition, the present invention provides a core-shell structured quantum dot particle prepared by the preparation method of the present invention.

In addition, the present invention provides a population of the quantum dot particles comprising the core-shell structured quantum dot particles of the present invention.

In addition, the present invention provides a display device comprising the population of the core-shell structured quantum dot particles of the present invention.

According to the preparation method of the core-shell structured quantum dot particle of the present invention, it is possible to efficiently prepare a core-shell structured quantum dot particle with uniform particle size, excellent quantum yield (QY), and narrow full width at half maximum.

In addition, the core-shell structured quantum dot particles and population of the quantum dot particles prepared by the above method provide characteristics of uniform particle size, excellent quantum yield (QY), and narrow full width at half maximum.

In addition, the display device comprising the core-shell structured quantum dot particles or population of the quantum dot particles provide excellent quality and durability.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention.

DETAILED DESCRIPTION

Hereinafter, the present invention will be described in detail.

As described in the background art, in order to make the particle size distribution of quantum dot particles uniform, research on a method of controlling the growth of core particles is being made variously in the field of preparing a quantum dot particle. However, the method of obtaining uniform particle size by controlling the growth of core particles does not provide a satisfactory effect.

The inventors of the present invention have broken from this prior art, and have found that it is more effective for the preparation of quantum dot particles having a uniform size to control the growth rate of the particles during the preparation of the shell of quantum dot particles, rather than to control the size of the quantum dot core, thereby completing the present invention.

Figure 1:
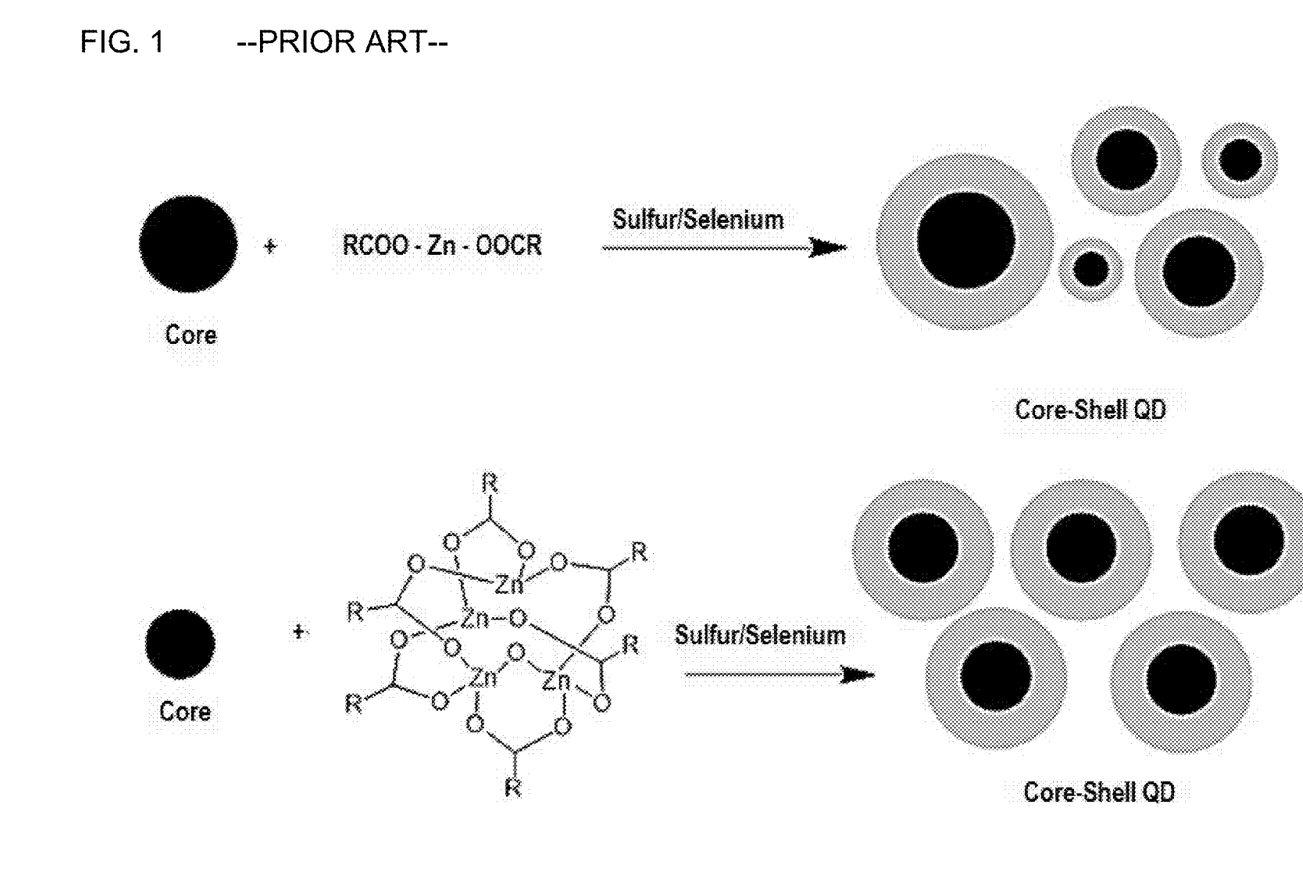
FIG. 1 is a view schematically showing the form of quantum dot particles prepared by the prior art and the present invention.

That is, it was confirmed that when a shell is formed using a zinc oxo cluster, which is an oligomer in the form of zinc oxide, the zinc oxo cluster reacts with Se and S of the anion precursor to control the growth of the shell. This reaction suppresses the rapid depletion of Se and S, thereby making it possible to prepare quantum dot particles of uniform size (see FIG. 1).

In addition, it was confirmed that according to this method, not only the shell alloy is effectively formed on the InP and InZnP cores, but also the oxide layer is formed, so that it is possible to effectively control the defect level inside and outside the quantum dot particle.

As a result, according to the manufacturing method of the present invention, it is possible to obtain core-shell quantum dot particles having a uniform size, to increase the quantum efficiency, and to lower the full width at half maximum, as well as to prevent the decrease in quantum efficiency of the quantum dot particles due to oxidation.

Specifically, the present invention relates to a method of preparing a core-shell structured quantum dot particle comprising the steps of, (a) preparing a core of quantum dot particle containing indium (In) and phosphorus (P); and (b) reacting the core of the quantum dot particle prepared in step (a), zinc oxo cluster, which is an oligomer in a form of zinc oxide, one or more anion precursors containing a group 16 element, and a cation precursor containing a Group 12 element to form a shell.

The zinc oxo cluster is prepared by heat-treating a zinc-carboxylate precursor in which a linear or branched alkyl carboxylate group having 2 to 20 carbon atoms or a linear or branched alkenyl carboxylate group having 3 to 20 carbon atoms is bonded with ion of zinc, at 250 to 380° C. At this time, the time for the heat treatment is not particularly limited, but the heat treatment may be performed for 3 to 5 hours.

The zinc oxo cluster may be a compound represented by Formula 1 below:

[Formula 1]

wherein R may be the same as or different from each other and may each independently be a linear or branched alkyl group having 2 to 20 carbon atoms or a linear or branched alkenyl group having 2 to 20 carbon atoms.

More preferably, R may be the same as or different from each other and may each independently be a linear or branched alkyl group having 8 to 20 carbon atoms or a linear or branched alkenyl group having 8 to 20 carbon atoms.

More preferably, R may be the same as or different from each other and may each independently be a linear or branched alkyl group having 12 to 20 carbon atoms or a linear or branched alkenyl group having 12 to 20 carbon atoms.

In one embodiment of the present invention, the reaction of step (b) may further comprise a cation precursor containing a Group 12 element as a reactant. The cation precursor containing the Group 12 element may be included in the case where unreacted material remains and participates in the reaction in the preparation process of the zinc oxo cluster, and also may be included by being intentionally added to the reaction.

The cation precursor containing the Group 12 element may be a Group 12 element-carboxylate in which a linear or branched alkyl carboxylate group having 2 to 20 carbon atoms or a linear or branched alkenyl carboxylate group having 3 to 20 carbon atoms is bonded to one or more Group 12 elements.

In one embodiment of the present invention, the one or more anion precursors containing the Group 16 element in step (b) may be one or more selected from a phosphine-sulfide precursor in which one or more selected from trioctylphosphine, tridecylphosphine, tridodecylphosphine, triphenylphosphine, tritolylphosphine, and trissilylmethylphosphine is bonded with ion of sulfur; and a phosphine-selenide precursor in which one or more selected from trioctylphosphine, tridecylphosphine, tridodecylphosphine, triphenylphosphine, tritolylphosphine, and trissilylmethylphosphine is bonded with ion of selenium.

The manufacturing method of the zinc oxo cluster can be illustrated by Reaction Scheme 1 below:

In one embodiment of the present invention, the Group 12 element may be at least one selected from zinc, cadmium, and mercury.

In one embodiment of the present invention, the group 16 element may be at least one selected from selenium and sulfur.

In one embodiment of the present invention, the linear or branched alkyl carboxylate group having 2 to 20 carbon atoms may be a derivative derived from a carboxylic acid selected from the group consisting of valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, and arachidic acid; and the linear or branched alkenyl carboxylate group having 3 to 20 carbon atoms may be a derivative derived from a carboxylic acid selected from the group consisting of stearidonic acid, palmitoleic acid, vaccenic acid, paullinic acid, oleic acid, and gondoic acid.

In one embodiment of the present invention, the core of the quantum dot particle may further include zinc (Zn). Specifically, the core of the quantum dot particle may be InP, InZnP, or the like.

In one embodiment of the present invention, the core of the quantum dot particle containing indium (In) and phosphorus (P) may be prepared by reacting reactants including a indium-carboxylate precursor in which a linear or branched alkyl carboxylate group having 2 to 20 carbon atoms or a linear or branched alkenyl carboxylate group having 3 to 20 carbon atoms is bonded with ion of indium, and one or more anion precursors selected from tris(trimethylsilyl)phosphine, trioctylphosphine, trinonylphosphine, diphenylphosphine, tridecylphosphine and the like, but the types of the precursors are not limited thereto, and known precursors may be used without limitation.

In one embodiment of the present invention, the reactant for the preparation of the core of quantum dot particles containing indium (In) and phosphorus (P) may further include a indium-carboxylate precursor in which a linear or branched alkyl carboxylate group having 2 to 20 carbon atoms or a linear or branched alkenyl carboxylate group having 3 to 20 carbon atoms is bonded with ion of zinc.

In one embodiment of the present invention, the reactant for the preparation of the core of quantum dot particles containing indium (In) and phosphorus (P) may further include a zinc oxo cluster, which is an oligomer in the form of zinc oxide.

The zinc oxo cluster is prepared by heat-treating a zinc-carboxylate precursor in which a linear or branched alkyl carboxylate group having 2 to 20 carbon atoms or a linear or branched alkenyl carboxylate group having 3 to 20 carbon atoms is bonded with ion of zinc, at 250 to 380° C. At this time, the time for the heat treatment is not particularly limited, but the heat treatment may be performed for 3 to 5 hours. An example of the preparation method of the zinc oxo cluster is the same as described above.

The zinc oxo cluster may be a compound represented by Formula 1 below:

[Formula 1]

wherein R may be the same as or different from each other and may each independently be a linear or branched alkyl group having 2 to 20 carbon atoms or a linear or branched alkenyl group having 2 to 20 carbon atoms.

More preferably, R may be the same as or different from each other and may each independently be linear or branched alkyl group having 8 to 20 carbon atoms or a linear or branched alkenyl group having 8 to 20 carbon atoms.

More preferably, R may be the same as or different from each other and may each independently be a linear or branched alkyl group having 12 to 20 carbon atoms or a linear or branched alkenyl group having 12 to 20 carbon atoms.

In one embodiment of the present invention, the reactant for preparing the core of the quantum dot particle containing indium (In) and phosphorus (P) may not include the zinc oxo cluster. That is, the present invention may have a feature that does not use the zinc oxo cluster in the preparation of the core, since the main feature is that the zinc oxo cluster is used in the preparation of the shell.

In addition, the present invention relates to a core-shell structured quantum dot particle prepared by the above preparation method.

The quantum dot particle may include a core of InP or InZnP and a shell of $ZnS_xSe_{1-x}$ (where $0 \leq x \leq 1$). For example, the quantum dot particle may have a structure such as InP/ZnSSe or InP/ZnSSe.

In one embodiment of the present invention, the full width at half maximum of the maximum photoluminescence peak of the quantum dot particle may be 40 nm or less, preferably 39 nm or less, more preferably 37 nm or less, particularly preferably 35 nm or less.

In one embodiment of the present invention, the photoluminescence quantum yield of the quantum dot particle may be 88% or more, preferably 90% or more, more preferably 92% or more, particularly preferably 94% or more.

In addition, the present invention relates to a population of the quantum dot particles comprising the core-shell structured quantum dot particles of the present invention.

In one embodiment of the present invention, the full width at half maximum of the maximum photoluminescence peak of the population of the quantum dot particles may be 40 nm or less, preferably 39 nm or less, more preferably 37 nm or less, particularly preferably 35 nm or less.

In one embodiment of the present invention, the photoluminescence quantum yield of the population of the quantum dot particles may be 88% or more, preferably 90% or more, more preferably 92% or more, particularly preferably 94% or more.

In one embodiment of the present invention, the population of the quantum dot particles may have an ST value of Equation 1 below measured for storage stability of 80% or more, preferably 81% or more, more preferably 83% or more, even more preferably 88% or more, during dispersion storage for organic material:

$$ST = (QY_{Ini}/QY_{10day}) \times 100 \qquad \text{[Equation 1]}$$

$QY_{Ini}$: Initial quantum yield of the dispersed population of the quantum dot particles, and $QY_{10day}$: Quantum yield after storing the dispersed population of the quantum dot particles in a sealed condition at 25° C. and 65% relative humidity for 10 days.

The organic material may be at least one selected from an organic solvent and an organic polymer.

The organic material may comprise at least one selected from the group consisting of ether-based solvents; aromatic hydrocarbon-based solvents; ketone-based solvents; alcohol-based solvents; ester-based solvents; and amide-based solvents. The ether-based solvent may be at least one selected from the group consisting of ethylene glycol monoalkyl ether-based solvent selected from the group consisting of ethylene glycol monomethyl ether, ethylene glycol monoethyl ether, ethylene glycol monopropyl ether and ethylene glycol monobutyl ether; diethylene glycol dialkylether-based solvent selected from the group consisting of diethylene glycol dimethyl ether, diethylene glycol diethyl ether, diethylene glycol dipropyl ether and diethylene glycol dibutyl ether; at least one ethylene glycol alkyl ether acetate-based solvent selected from the group consisting of methyl cellosolve acetate and ethyl cellosolve acetate; and alkylene glycol alkyl ether acetate-based solvent selected from the group consisting of propylene glycol monomethyl ether acetate, propylene glycolmonoethyl ether acetate, propylene glycol monopropyl ether acetate, methoxybutyl acetate and methoxypentyl acetate.

The aromatic hydrocarbon-based solvent may be at least one selected from the group consisting of benzene, toluene, xylene and mesitylene. The ketone-based solvent may be at least one selected from the group consisting of methylethyl ketone, acetone, methylamyl ketone, methylisobutyl ketone and cyclohexanone. The alcohol-based solvent may be at least one selected from the group consisting of ethanol, propanol, butanol, hexanol, cyclohexanol, ethylene glycol, and glycerin. The ester-based solvent may be an ester-based solvent such as 3-ethoxypropionic acid ethyl or 3-methoxypropionic acid methyl, or a cyclic ester-based solvent such as γ-butyrolactone.

As the organic polymer, polymers known in the art may be used without limitation. For example, the organic polymer may be at least one selected from the group consisting of a polymer of a carboxyl group-containing unsaturated monomer, or a copolymer with a monomer having an unsaturated bond co-polymerizable therewith, and combinations thereof. In this case, the carboxyl group-containing unsaturated monomer may be an unsaturated monocarboxylic acid, an unsaturated dicarboxylic acid, or an unsaturated tricarboxylic acid. Specifically, examples of the unsaturated monocarboxylic acid may be acrylic acid, methacrylic acid, crotonic acid, α-chloroacrylic acid, cinnamic acid, and the like. Examples of the unsaturated dicarboxylic acid may be maleic acid, fumaric acid, itaconic acid, citraconic acid, mesaconic acid, and the like. The unsaturated polyhydric carboxylic acid may be an acid anhydride, and specifically may be maleic anhydride, itaconic anhydride, citraconic acid anhydride, and the like. In addition, the unsaturated polyhydric carboxylic acid may be its mono(2-methacryloyloxyalkyl)ester, and may be, for example, succinic acid mono (2-acryloyloxyethyl), succinic acid mono(2-methacryloyloxyethyl), phthalic acid mono(2-acryloyloxyethyl), phthalic acid mono(2-methacryloyloxyethyl), and the like. The unsaturated polyhydric carboxylic acid may be a mono(meth)acrylate of a dicarboxy polymer at both ends, and may be, for example, ω-carboxypolycaprolactone monoacrylate, ω-carboxypolycaprolactone monomethacrylate, and the like. These carboxyl group-containing monomers may be used alone or as a mixture of two or more. In addition, the monomer copolymerizable with the carboxyl group-containing unsaturated monomer may be one selected from the group consisting of aromatic vinyl compounds, unsaturated carboxylic acid ester compounds, unsaturated carboxylic acid aminoalkyl ester compounds, unsaturated carboxylic acid glycidyl ester compounds, carboxylic acid vinyl ester compounds, unsaturated ether compounds, vinyl cyanide compounds, unsaturated imide compounds, aliphatic conjugated diene compounds, macromonomers having a monoacryloyl group or a monomethacryloyl group at the end of the molecular chain, bulky monomers and combinations thereof. More specifically, the copolymerizable monomer may be aromatic vinyl compounds such as styrene, α-methylstyrene, o-vinyltoluene, m-vinyltoluene, p-vinyltoluene, p-chlorostyrene, o-methoxystyrene, m-methoxystyrene, p-methoxystyrene, o-vinylbenzylmethyl ether, m-vinylbenzylmethyl ether, p-vinylbenzylmethyl ether, o-vinylbenzylglycidyl ether, m-vinylbenzylglycidyl ether, p-vinylbenzylglycidyl ether, and indene; unsaturated carboxylic acid esters such as methylacrylate, methylmethacrylate, ethylacrylate, ethylmethacrylate, n-propylacrylate, n-propylmethacrylate, i-propylacrylate, i-propylmethacrylate, n-butylacrylate, n-butylmethacrylate, i-butylacrylate, i-butylmethacrylate, sec-butylacrylate, sec-butylmethacrylate, t-butylacrylate, t-butylmethacrylate, 2-hydroxyethylacrylate, 2-hydroxyethylmethacrylate, 2-hydroxypropylacrylate, 2-hydroxypropylmethacrylate, 3-hydroxypropylacrylate, 3-hydroxypropylmethacrylate, 2-hydroxybutylacrylate, 2-hydroxybutylmethacrylate, 3-hydroxybutylacrylate, 3-hydroxybutylmethacrylate, 4-hydroxybutylacrylate, 4-hydroxybutylmethacrylate, allylacrylate, allylmethacrylate, benzylacrylate, benzylmethacrylate, cyclohexylacrylate, cyclohexylmethacrylate, phenylacrylate, phenylmethacrylate, 2-methoxyethylacrylate, 2-methoxyethylmethacrylate, 2-phenoxyethylacrylate, 2-phenoxyethylmethacrylate, methoxydiethylene glycol acrylate, methoxydiethylene glycol methacrylate, methoxytriethylene glycol acrylate, methoxytriethylene glycol methacrylate, methoxypropylene glycolacrylate, methoxypropylene glycolmethacrylate, methoxydipropylene glycolacrylate, methoxydipropylene glycolmethacrylate, isobornylacrylate, isobornylmethacrylate, dicyclopentadienylacrylate, dicyclopentadiethylmethacrylate, adamantyl(meth)acrylate, norbornyl(meth)acrylate, 2-hydroxy-3-phenoxypropylacrylate, 2-hydroxy-3-phenoxypropylmethacrylate, glycerol monoacrylate, and glycerol monomethacrylate; unsaturated carboxylic acid aminoalkyl ester compounds such as 2-aminoethylacrylate, 2-aminoethylmethacrylate, 2-dimethylaminoethylacrylate, 2-dimethylaminoethyl methacrylate, 2-aminopropylacrylate, 2-aminopropylmethacrylate, 2-dimethylaminopropylacrylate, 2-dimethylaminopropylmethacrylate, 3-aminopropylacrylate, 3-aminopropylmethacrylate, 3-dimethylaminopropylacrylate, and 3-dimethylaminopropylmethacrylate; unsaturated carboxylic acid glycidyl ester compounds such as glycidylacrylate, glycidylmethacrylate; carboxylic acid vinyl ester compounds such as vinyl acetate, vinyl propionate, vinyl butyrate, and vinyl benzoate; unsaturated ether compounds such as vinyl methyl ether, vinyl ethyl ether, and allylglycidyl ether; vinyl cyanide compounds such as acrylonitrile, methacrylonitrile, a-chloroacrylonitrile, and vinylidene cyanide; unsaturated amides such as acrylamide, methacrylamide, α-chloroacrylamide, N-2-hydroxyethylacrylamide, and N-2-hydroxyethylmethacrylamide; unsaturated imide compounds such as maleimide, benzylmaleimide, N-phenylmaleimide, and N-cyclohexylmaleimide; aliphatic conjugated dienes such as 1,3-butadiene, isoprene and chloroprene; and polystyrene, polymethylacrylate, polymethylmethacrylate, poly-n-butylacrylate, poly-n-butylmethacrylate, macromonomers having a monoacryloyl group or a monomethacryloyl group at the end of the polymer molecular chain of polysiloxane; bulky monomers such as monomers having a norbornyl skeleton capable of lowering the specific dielectric constant value, monomers having an adamantane skeleton, and monomers having a rosin skeleton.

In addition, the present invention relates to a display device comprising the population of the core-shell structured quantum dot particles of the present invention. Examples of the display device comprise, but are not limited to, LEDs and OLEDs.

Hereinafter, preferred examples are provided to help understanding of the present invention, but the following examples are merely illustrative of the present invention, and it is apparent to those skilled in the art that various changes and modifications can be made within the scope and technical spirit of the present invention, and it is natural that such changes and modifications belong to the appended claims.

Preparation Example 1: Preparation of Zinc Precursor

To a 3-neck 5 L glass reactor equipped with a thermometer, magnetic stirrer, reduced pressure vacuum device, and heating mantle, 550.44 g (3 mol) of zinc acetate and 1779.56 g (6.3 mol) of oleic acid were added, and heated to raise the temperature to 170° C. while stirring. Thereafter, a zinc precursor of a zinc oleate compound was prepared while removing acetic acid produced as a by-product by reducing the pressure to a vacuum of 10 mTorr. After the reduced pressure at 170° C. for 3 hours, it was confirmed that acetic acid, which is a by-product, was not discharged to the outside, thereby terminating the reaction.

Preparation Example 2: Preparation of Zinc Oxo Cluster (1)

To a 3-neck 5 L glass reactor equipped with a thermometer, magnetic stirrer, reduced pressure vacuum device, and heating mantle, 550.44 g (3 mol) of zinc acetate and 1779.56 g (6.3 mol) of oleic acid were added, and heated to raise the temperature to 180° C. while stirring. Thereafter, a zinc precursor of a zinc oleate compound was prepared while removing acetic acid produced as a by-product by reducing the pressure to a vacuum of 10 mTorr. After the reduced pressure at 180° C. for 3 hours, it was confirmed that acetic acid, which is a by-product, was not discharged to the outside, thereby releasing the pressure. Thereafter, the temperature was raised to 330° C. by heating while introducing argon gas, and after reacting for 2 hours, it was confirmed that the zinc precursor was changed from a transparent state to a haze state, thereby terminating the reaction.

Preparation Example 3: Preparation of Zinc Oxo Cluster (11)

To a 3-neck 5 L glass reactor equipped with a thermometer, magnetic stirrer, reduced pressure vacuum device, and heating mantle, 550.44 g (3 mol) of zinc acetate and 1779.56 g (6.3 mol) of oleic acid were added, and heated to raise the temperature to 170° C. while stirring. Thereafter, a zinc precursor of a zinc oleate compound was prepared while removing acetic acid produced as a by-product by reducing the pressure to a vacuum of 10 mTorr. After the reduced pressure at 170° C. for 3 hours, it was confirmed that acetic acid, which is a by-product, was not discharged to the outside, thereby releasing the pressure. Thereafter, the temperature was raised to 260° C. by heating while introducing argon gas, and after reacting for 5 hours, it was confirmed that the zinc precursor was changed from a transparent state to a haze state, thereby terminating the reaction.

Experimental Example 1: Measurement of Absorbance of Cationic Zinc Precursor Compounds of Preparation Examples 1 to 3

Figure 2:
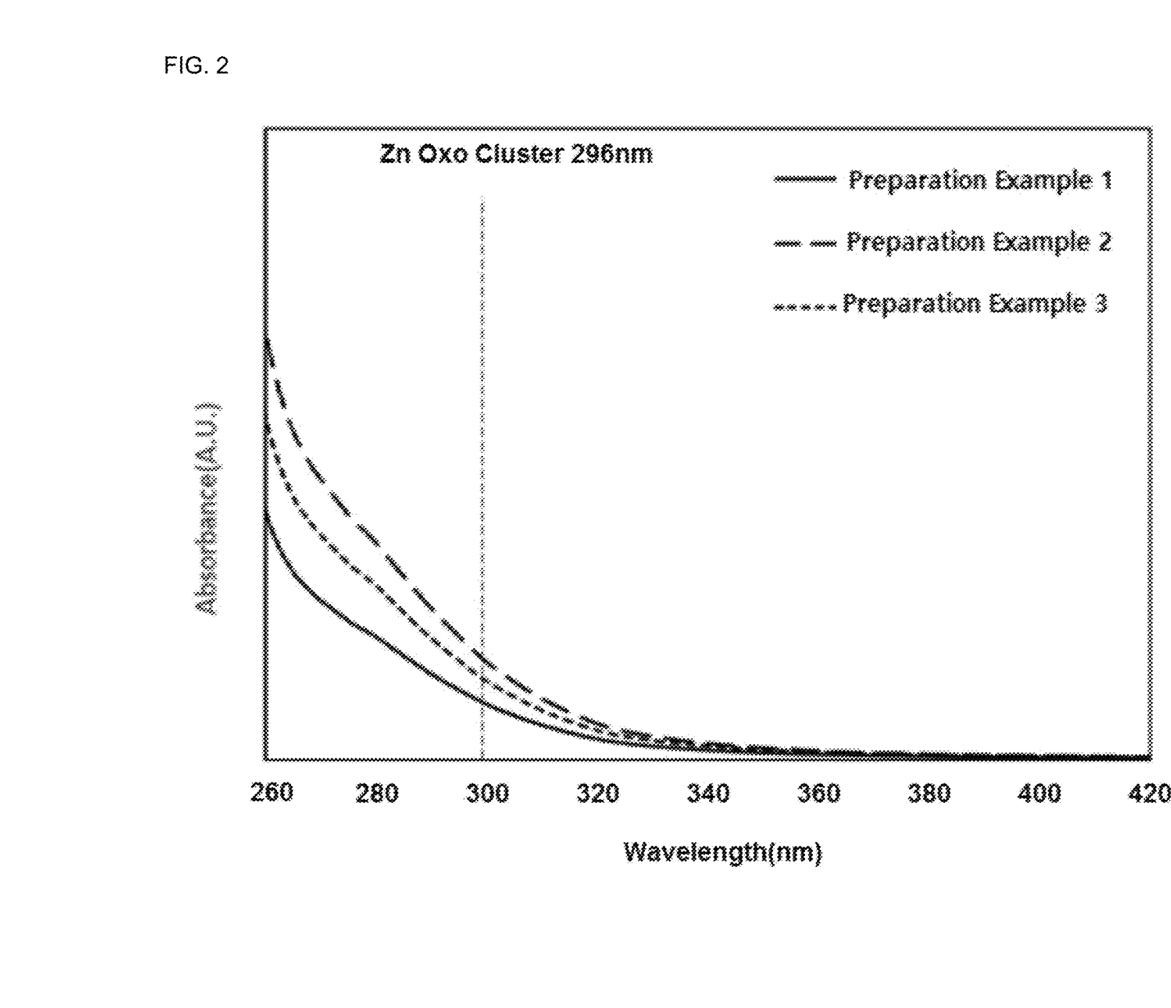
FIG. 2 is a graph showing the measurement result of the absorbance of the zinc precursor prepared in Preparation Examples 1 to 3 of the present invention.

The absorbance of the cationic zinc precursor compounds prepared in Preparation Examples 1 to 3 was measured in a 1×1×10 cm quartz cell using UV-vis spectroscopy (UV 2450 from Shimatsu Corporation), and the results are shown in FIG. 2. From FIG. 2, it can be confirmed that if the amount of zinc oxo clusters is increased, the absorption wavelength becomes larger at 296 nm or less.

Preparation Example 4: Preparation of Green Core

To a 3-neck flask, 0.05839 g (0.2 mmol) of indium acetate, 0.12019 g (0.6 mmol) of lauric acid, and 10 ml of 1-octadecene were added. After a process of agitating the flask and removing volatile components for 30 minutes at 110° C. under 100 mTorr at the same time, the reaction was carried out while maintaining a temperature of 270° C. in a nitrogen atmosphere until the solution became transparent. 0.02435 g (0.05 mmol) of tris(trimethylsilyl)phosphine and trioctylphosphine (1 ml) were mixed, stirred, and quickly injected into the flask heated to 270° C. in a nitrogen atmosphere. After reacting for 1 hour, the reaction was terminated by rapid cooling. Then, when the temperature of the flask reached 100° C., 10 ml of toluene was injected and then transferred to a 50 ml centrifuge tube. After adding 10 ml of ethanol, purification was repeated twice using the precipitation and redispersion method, and the product was dispersed in 13 g of toluene to prepare a dispersion of quantum dot particles of the InP core.

Preparation Example 5: Preparation of Red Core 0.2 mmol of indium acetate and 0.6 mmol of lauric acid (n=10 in Formula 2) were dissolved in 10 ml of 1-octadecene to prepare a solution. After a process of removing volatile components for 30 minutes at 110° C. under 100 mTorr while stirring the solution, the ligand exchange reaction was carried out while maintaining the temperature of 270° C. in a nitrogen atmosphere until the solution became transparent, thereby forming the first precursor for the formation of the core.

In order to form the second precursor for the formation of the core, 0.2 mmol of zinc acetate and 0.6 mmol of oleic acid were dissolved in 10 ml of 1-octadecene to prepare a solution. After a process of removing volatile components for 30 minutes at 140° C. under 100 mTorr while stirring the solution, the ligand exchange reaction was carried out while maintaining the temperature at 270° C. in a nitrogen atmosphere until the solution became transparent. The first and second precursors for the formation of the core were mixed in a tris(trimethylsilyl)phosphine solvent at a molar ratio of 1:1, stirred, and quickly injected into the flask heated to 270° C. in a nitrogen atmosphere. After reacting for 1 hour, the reaction was terminated by rapid cooling. Then, when the temperature of the flask reached 100° C., 10 ml of toluene was injected and then transferred to a 50 ml centrifuge tube. After adding 10 ml of ethanol, purification was repeated twice using the precipitation and redispersion method, and the product was dispersed in 13 g of toluene to prepare a dispersion of quantum dot particles of the InZnP core.

Example 1: Preparation of Green Quantum Dot Particles (InP/ZnSSe) in which the Shell was Prepared Using a Zinc Oxo Cluster 22.45 g of zinc oxo cluster (compound 1-1) prepared in Preparation Example 2 was added to 30 ml of 1-octadecene to prepare a mixture containing compound 1-1.

To a 100 ml three-necked flask, 0.9612 g (30 mmol) of sulfur and 15 ml of trioctylphosphine were added and heated to 80° C. while stirring under a nitrogen atmosphere to prepare compound 2 in which sulfur was bonded to trioctylphosphine.

To a 100 ml three-necked flask, 2.3691 g (30 mmol) of selenium and 15 ml of trioctylphosphine were added and heated to 80° C. while stirring under a nitrogen atmosphere to prepare compound 3 in which selenium was bonded to trioctylphosphine.

2.5 ml of the toluene dispersion of the InP core prepared in Preparation Example 4 was prepared, and then, 1-octadecene (15 ml) and a mixture (2.4 ml) containing the compound 1-1 prepared above were put together in a three-necked flask and stirred, and at the same time as stirring, the volatile components were removed at 110° C. under 200 mTorr for 30 minutes. Thereafter, under an inert gas atmosphere, compound 2 (0.3 ml) and compound 3 (0.3 ml) prepared above were added and heated to 270° C. After reacting for 1 hour, cooling was performed to synthesize quantum dot particles having an InP/ZnSSe structure.

Example 2: Preparation of Green Quantum Dot Particles (InP/ZnSSe) in which a Shell was Prepared Using a Zinc Oxo Cluster Quantum dot particles having an InP/ZnSSe structure were synthesized in the same manner as in Example 1, except that in the preparation of the mixture containing compound 1-1 in Example 1, the zinc oxo cluster (Compound 1-2) prepared in Preparation Example 3 is used instead of the zinc oxo cluster (Compound 1-1) prepared in Preparation Example 2.

Example 3: Preparation of Red Quantum Dot Particles (InZnP/ZnSSe) in which a Shell was Prepared Using a Zinc Oxo Cluster 22.45 g of zinc oxo cluster (compound 1-1) prepared in Preparation Example 2 was added to 30 ml of 1-octadecene to prepare a mixture containing compound 1-1.

To a 100 ml three-necked flask, 0.9612 g (30 mmol) of sulfur and 15 ml of trioctylphosphine were added and heated to 80° C. while stirring under a nitrogen atmosphere to prepare compound 2 in which sulfur was bonded to trioctylphosphine.

To a 100 ml three-necked flask, 2.3691 g (30 mmol) of selenium and 15 ml of trioctylphosphine were added and heated to 80° C. while stirring under a nitrogen atmosphere to prepare compound 3 in which selenium was bonded to trioctylphosphine.

2.5 ml of the toluene dispersion of the InZnP core prepared in Preparation Example 5 was prepared, and then, 1-octadecene (15 ml) and a mixture (2.4 ml) containing the compound 1-1 prepared above were put together in a three-necked flask and stirred, and at the same time as stirring, the volatile components were removed at 110° C. under 200 mTorr for 30 minutes. Thereafter, under an inert gas atmosphere, compound 2 (0.3 ml) and compound 3 (0.3 ml) prepared above were added and heated to 270° C. After reacting for 1 hour, cooling was performed to synthesize InZnP/ZnSSe quantum dot particles.

Example 4: Preparation of Green Quantum Dot Particles (InZnP/ZnSSe) in which a Shell was Prepared Using a Zinc Oxo Cluster Quantum dot particles having an InZnP/ZnSSe structure were synthesized in the same manner as in Example 3, except that in the preparation of the mixture containing compound 1-1 in Example 3, the zinc oxo cluster (Compound 1-2) prepared in Preparation Example 3 is used instead of the zinc oxo cluster (Compound 1-1) prepared in Preparation Example 2.

Comparative Example 1: Preparation of Green Quantum Dot Particles (InP/ZnSSe) in which a Shell was Prepared Using a Zinc Cluster Quantum dot particles having an InP/ZnSSe structure were synthesized in the same manner as in Example 1, except that in the preparation of the mixture containing compound 1-1 in Example 1, the zinc cluster prepared in Preparation Example 1 is used instead of the zinc oxo cluster (Compound 1-1).

Comparative Example 2: Preparation of Red Quantum Dot Particles (InZnP/ZnSSe) in which a Shell was Prepared Using a Zinc Cluster Quantum dot particles having an InZnP/ZnSSe structure were synthesized in the same manner as in Example 3, except that in the preparation of the mixture containing compound 1-1 in Example 3, the zinc cluster prepared in Preparation Example 1 is used instead of the zinc oxo cluster (Compound 1-1).

Experimental Example 2: Analysis of Photoluminescence

Figure 3:
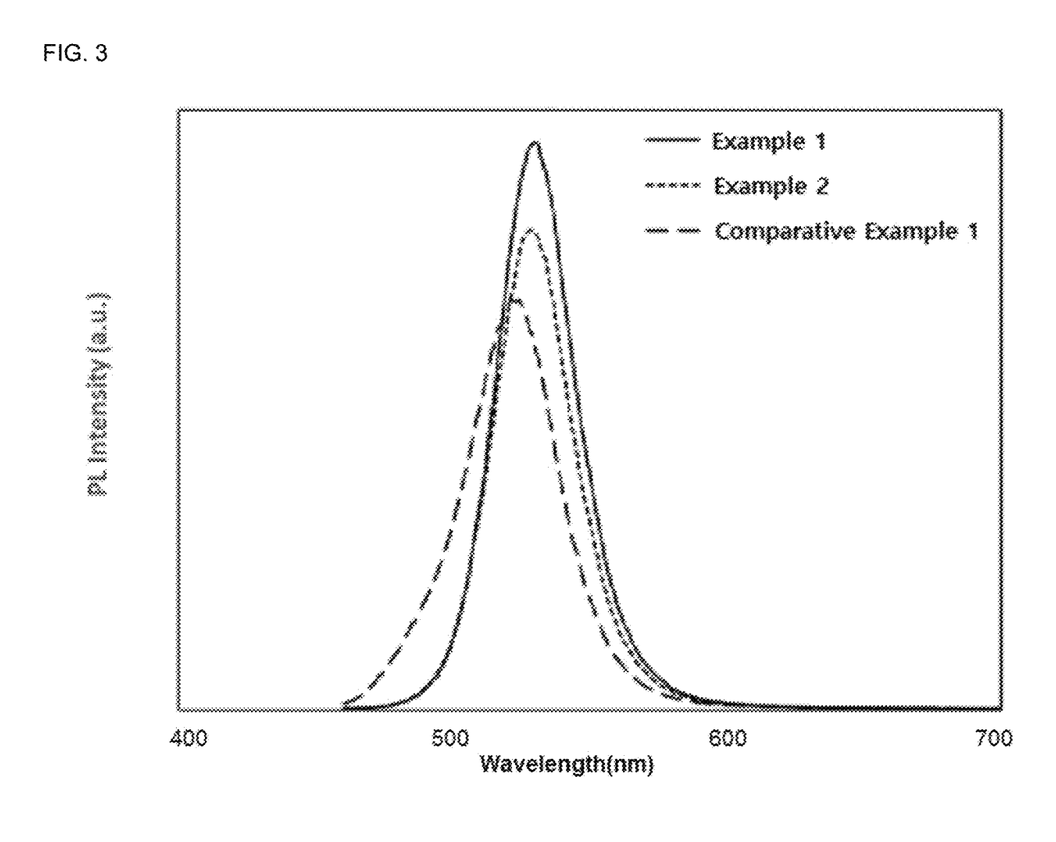
FIG. 3 is a graph showing the measurement results of the initial emission peak of the green core-shell quantum dot particles prepared in Examples 1 and 2 of the present invention and Comparative Example 1.
Figure 4:
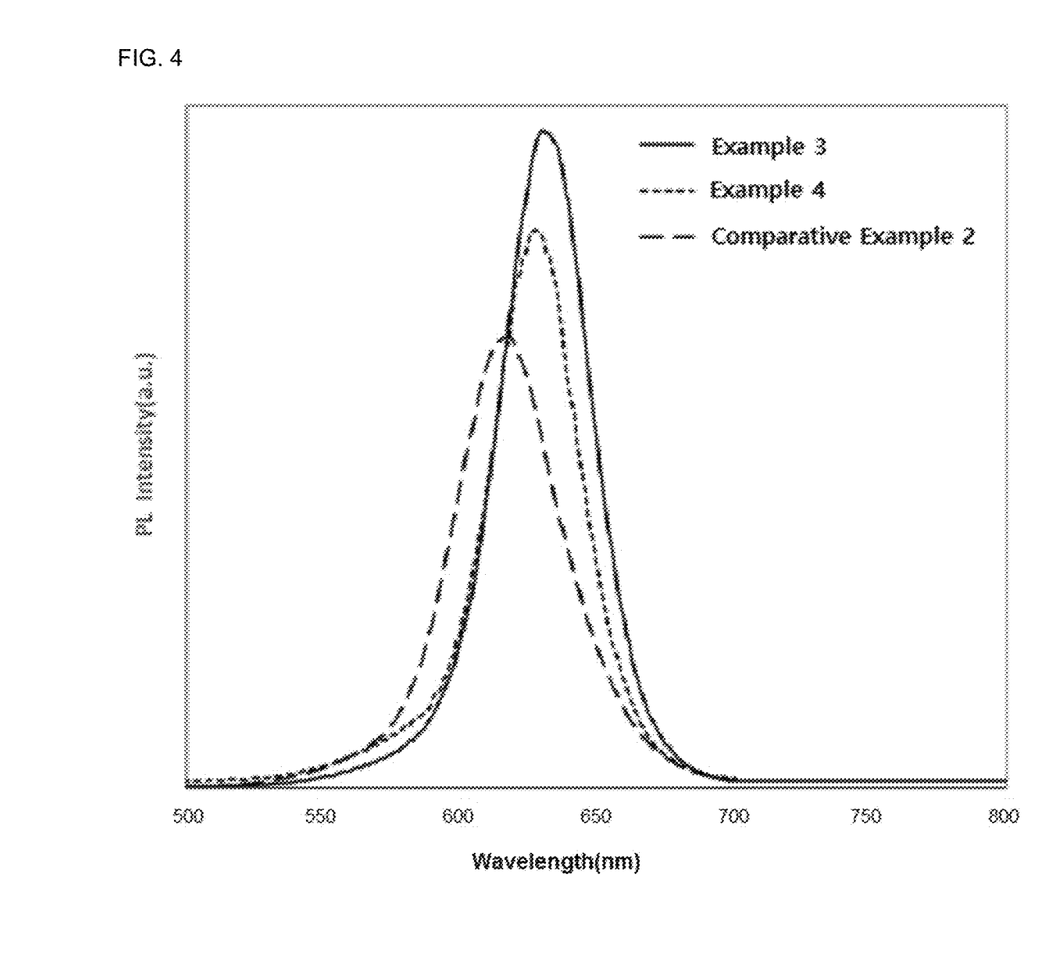
FIG. 4 is a graph showing the measurement results of the initial emission peak of the red core-shell quantum dot particles prepared in Examples 3 and 4 of the present invention and Comparative Example 2.

The optical properties of the quantum dot particles of Examples 1 to 4 and Comparative Examples 1 to 2 were measured using a quantum yield measurement system (Otsuka Electronics, QE-2100). The quantum dot particles are dispersed in toluene, excitation light is emitted to obtain a luminescence spectrum, and the quantum yield (QY), full width at half maximum (FWHM) and luminescence peak wavelength were calculated and measured from the luminescence spectrum after re-excitation correction excluding the re-excitation fluorescent luminescence spectrum as much as the amount of the amount of fluorescence emitted by re-excitation from the luminescence spectrum obtained here. In addition, each dispersion sample of quantum dot particles dispersed in toluene is sealed and stored in a constant-temperature and constant-humidity bath at 25° C. and 50% relative humidity, and at the initial stage, and after 5 days and 10 days, quantum yield (QY), full width at half maximum (FWHM) and luminescence peak wavelength were compared, and the results are shown in Table 1 and FIGS. 3 and 4 below.

TABLE 1

| | | Example 1 | Example 2 | Example 3 | Example 4 | Comparative Example 1 | Comparative Example 2 |
|---|---|---|---|---|---|---|---|
| Quantum efficiency (QY, %) | Initial | 96% | 90% | 94% | 91% | 87% | 85% |
| | 5 days | 93% | 84% | 92% | 86% | 72% | 69% |
| | 10 days | 92% | 81% | 88% | 83% | 63% | 60% |
| Full width at half maximum (FWHM, nm) | Initial | 33 | 35 | 34 | 37 | 39 | 42 |
| | 5 days | 33 | 35 | 34 | 37 | 41 | 48 |
| | 10 days | 34 | 37 | 34 | 38 | 44 | 51 |
| luminescence peak wavelength (λ max, nm) | Initial | 530 | 527 | 626 | 624 | 525 | 617 |
| | 5 days | 530 | 527 | 626 | 624 | 524 | 615 |
| | 10 days | 530 | 526 | 626 | 623 | 523 | 612 |

As shown in Table 1 above, in the case of the quantum dot particles of Examples 1 to 4 in which the shell was formed using zinc oxo cluster, they exhibited significantly superior quantum efficiency and full width at half maximum compared to the quantum dot particles of Comparative Examples 1 and 2 in which a shell was formed using a zinc carboxylate precursor. This result is considered to be because, when a shell is formed using a zinc oxo cluster, the reactivity is controlled and thus a shell having a uniform size is formed.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for preparing a core-shell structured quantum dot particle comprising:
   (a) preparing a core of quantum dot particle containing indium (In) and phosphorus (P); and
   (b) reacting the core of the quantum dot particle prepared in step (a), zinc oxo cluster, which is an oligomer in a form of zinc oxide, one or more anion precursors containing a group 16 element, and a cation precursor containing a Group 12 element to form a shell.

2. The method for preparing the core-shell structured quantum dot particle according to claim 1, wherein the zinc oxo cluster is prepared by heat-treating a zinc-carboxylate precursor in which a linear or branched alkyl carboxylate group having 2 to 20 carbon atoms or a linear or branched alkenyl carboxylate group having 3 to 20 carbon atoms is bonded with ion of zinc, at 250 to 380° C.

3. The method for preparing the core-shell structured quantum dot particle according to claim 2, wherein the linear or branched alkyl carboxylate group having 2 to 20 carbon atoms is a derivative derived from a carboxylic acid selected from the group consisting of valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, and arachidic acid; and the linear or branched alkenyl carboxylate group having 3 to 20 carbon atoms is a derivative derived from a carboxylic acid selected from the group consisting of stearidonic acid, palmitoleic acid, vaccenic acid, paullinic acid, oleic acid, and gondoic acid.

4. The method for preparing the core-shell structured quantum dot particle according to claim 1, wherein the zinc oxo cluster is a compound represented by Formula 1 below:

[Formula 1]

wherein R is the same as or different from each other and is each independently a linear or branched alkyl group having 2 to 20 carbon atoms or a linear or branched alkenyl group having 2 to 20 carbon atoms.

5. The method for preparing the core-shell structured quantum dot particle according to claim 1, wherein the cation precursor containing the Group 12 element is Group 12 element-carboxylate in which a linear or branched alkyl carboxylate group having 2 to 20 carbon atoms or a linear or branched alkenyl carboxylate group having 3 to 20 carbon atoms is bonded to one or more Group 12 elements.

6. The method for preparing the core-shell structured quantum dot particle according to claim 5, wherein the linear or branched alkyl carboxylate group having 2 to 20 carbon atoms or the linear or branched alkenyl carboxylate group having 3 to 20 carbon atoms is a derivative derived from a carboxylic acid selected from the group consisting of stearidonic acid, palmitoleic acid, vaccenic acid, paullinic acid, oleic acid, gondoic acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, and arachidic acid.

7. The method for preparing the core-shell structured quantum dot particle according to claim 1, wherein the one or more anion precursors containing the Group 16 element in step (b) is one or more selected from a phosphine-sulfide precursor in which one or more selected from trioctylphosphine, tridecylphosphine, tridodecylphosphine, triphenylphosphine, tritolylphosphine, and trissilylmethylphosphine is bonded with ion of sulfur; and a phosphine-selenide precursor in which one or more selected from trioctylphosphine, tridecylphosphine, tridodecylphosphine, triphenylphosphine, tritolylphosphine, and trissilylmethylphosphine is bonded with ion of selenium.

8. The method for preparing the core-shell structured quantum dot particle according to claim 1, wherein the Group 12 element comprises at least one selected from zinc, cadmium, and mercury.

9. The method for preparing the core-shell structured quantum dot particle according to claim 1, wherein the Group 16 element includes at least one selected from selenium and sulfur.

10. The method for preparing the core-shell structured quantum dot particle according to claim 1, wherein the core of the quantum dot particles further comprises zinc (Zn).

11. The method for preparing the core-shell structured quantum dot particle according to claim 1, wherein the core of quantum dot particles containing indium (In) and phosphorus (P) is prepared by reacting a reactant comprising a indium-carboxylate precursor in which a linear or branched alkyl carboxylate group having 2 to 20 carbon atoms or a linear or branched alkenyl carboxylate group having 3 to 20 carbon atoms is bonded with ion of indium, and one or more anion precursors selected from tris(trimethylsilyl)phosphine, trioctylphosphine, trinonylphosphine, diphenylphosphine, and tridecylphosphine.

12. The method for preparing the core-shell structured quantum dot particle according to claim 11, wherein the reactant further comprises a zinc-carboxylate precursor in which a linear or branched alkyl carboxylate group having 2 to 20 carbon atoms or a linear or branched alkenyl carboxylate group having 3 to 20 carbon atoms is bonded with ion of zinc.

13. The method for preparing the core-shell structured quantum dot particle according to claim 12, wherein the reactant further comprises a zinc oxo cluster, which is an oligomer in the form of zinc oxide.

14. The method for preparing the core-shell structured quantum dot particle according to claim 11, wherein the reactant further comprises a zinc oxo cluster, which is an oligomer in the form of zinc oxide.

15. The method for preparing the core-shell structured quantum dot particle according to claim 11, wherein the reactant does not comprise a zinc oxo cluster, which is an oligomer in the form of zinc oxide.

16. A core-shell structured quantum dot particle prepared by a preparation method comprising:
(a) preparing a core of quantum dot particle containing indium (In) and phosphorus (P); and
(b) reacting the core of the quantum dot particle prepared in step (a), zinc oxo cluster, which is an oligomer in a form of zinc oxide, one or more anion precursors containing a group 16 element, and a cation precursor containing a Group 12 element to form a shell,
wherein in the step (a) of claim 1, a zinc oxo cluster, which is an oligomer in the form of zinc oxide, is not used as a reactant to prepare the core of quantum dot particle, and
wherein the core of the core-shell structured quantum dot particle does not comprise zinc.

17. The core-shell structured quantum dot particle according to claim 16, wherein the quantum dot particle includes a core of InP and a $ZnS_xSe_{1-x}$ shell (wherein $0 \leq x \leq 1$).

18. A population of the quantum dot particles comprising the core-shell structured quantum dot particle of claim 16.

19. A population of the quantum dot particles according to claim 18 characterized in that the full width at half maximum of the maximum luminescence peak of the population of the quantum dot particles is 40 nm or less.

20. The population of the quantum dot particles according to claim 19, wherein the luminescence quantum yield of the population of the quantum dot particles is 88% or more.

21. The population of the quantum dot particles according to claim 18, wherein the population of the quantum dot particles has an ST value of 83% or more in Equation 1 below, which measures storage stability during dispersion storage for organic material:

$$ST = (QY_{Ini} / QY_{10day}) \times 100 \qquad \text{[Equation 1]}$$

$QY_{Ini}$: Initial quantum yield of the dispersed population of the quantum dot particles, and
$QY_{10day}$: Quantum yield after storing the dispersed population of the quantum dot particles in a sealed condition at 25° C. and 65% relative humidity for 10 days.

22. The population of the quantum dot particles according to claim 21, wherein the organic material is at least one selected from an organic solvent and an organic polymer.

23. A display device comprising the population of the quantum dot particles of claim 18.

* * * * *